Oct. 24, 1950 J. N. M. HOWELLS 2,526,664

COMPUTER MECHANISM

Filed June 30, 1945 7 Sheets-Sheet 1

INVENTOR.
JOHN N. M. HOWELLS
BY
Ralph L. Chappell
ATTORNEY

Oct. 24, 1950 J. N. M. HOWELLS 2,526,664

COMPUTER MECHANISM

Filed June 30, 1945 7 Sheets-Sheet 2

INVENTOR.
JOHN N. M. HOWELLS
BY
Ralph L. Chappell
ATTORNEY

INVENTOR.
JOHN N. M. HOWELLS
BY
Ralph L. Chappell
ATTORNEY

COMPUTER MECHANISM

INVENTOR.
JOHN N. M. HOWELLS
BY Ralph L. Chappel
ATTORNEY

Oct. 24, 1950 J. N. M. HOWELLS 2,526,664

COMPUTER MECHANISM

Filed June 30, 1945 7 Sheets-Sheet 5

INVENTOR.
JOHN N. M. HOWELLS
BY
Ralph L. Chappell
ATTORNEY

INVENTOR.
JOHN N. M. HOWELLS
BY
Ralph L. Chappell
ATTORNEY

INVENTOR.
JOHN N. M. HOWELLS
BY Ralph L. Chappell
ATTORNEY

Patented Oct. 24, 1950 2,526,664

UNITED STATES PATENT OFFICE 2,526,664

COMPUTER MECHANISM

John N. M. Howells, United States Navy

Application June 30, 1945, Serial No. 602,625

11 Claims. (Cl. 235—61.5)

(Granted under the act of March 3, 1883, as amended April 30, 1928; 370 O. G. 757)

The present invention relates to fire-control equipment and has particular reference to computer mechanism of an aerial gun-sight.

To fire free guns from an airplane with any degree of accuracy, it is necessary that means be provided to compensate for the direction and velocity of movement of the airplane with respect to the target. Moreover, when firing from one moving airplane at another, it is necessary that correction be made for the relative speeds and directions of movement of both airplanes and that sight compensation be made according to the resultant of all of the speeds and motions involved.

Since speeds of modern aircraft may be as great as one-sixth of the speed of machine gun bullets, the amount of compensation required is relatively large and unless the correction is exactly calculated the projectiles go wide of the target.

Fixed sights are extremely difficult to use in free gunnery, since they give a false indication of the course of the bullets and require the gunner to estimate mentally the amount and direction of lead required, and to "hold off" accordingly. Certain types of computing sights have been developed in an effort to provide a greater degree of accuracy in aircraft gunnery, but these also have shortcomings that the present sight is designed to overcome.

One general type of computing sight utilizes a gyroscope and a so-called "disturbed reticule" so that, as the gunner tracks the target, the rate of angular movement of the gun is determined mechanically. This information, together with the range of the target, is fed into a computing device to calculate the lead required on the target in question and to deflect the optics of the sight from the axis of the gun barrel sufficiently to set in the required lead. This system has points of advantage, but it has serious disadvantages in that it includes complex and delicate mechanisms, easily subject to damage or maladjustment. More distressing, however, is the fact that this type of sight can function accurately only if the gunner is able to track the target smoothly over an interval of time immediately before firing, so that the angular rate of relative motion between the target and the gun is computed correctly by the mechanism. Moreover, this type of mechanism requires exact accuracy in the range setting, and an incorrect setting will cause the shots to go far wide of the target. Obviously, the target range is difficult to estimate or measure at best, and may be changing so fast as to make an accurate setting impossible.

It is the general aim of the present invention to provide an improved aerial gun sight in which the above disadvantages are largely overcome.

Since the guns of a bomber are intended primarily for defense against attacking fighter planes, the efficiency of any sighting mechanism is to be determined primarily by its effectiveness against other aircraft as they attack the bomber. It is essential, however, that the free guns of the bomber also be useful against fixed targets on land so that the gunner will be able to strafe effectively stationary targets such as ammunition dumps, oil tanks, etc.

One of the principal objects of the present invention is to provide a simplified aerial gun sight requiring no setting of range, no estimate of the lead due to the speed of the gunner's own plane, no estimate of the lead due to the movement of an attacking fighter plane, and yet capable of accurate fire at stationary targets or attacking aircraft.

Another object is to provide an aerial gun sight so designed and constructed that the sight can be set to compensate automatically for the "own speed" lead necessitated by the speed of movement of the gun platform, so that it gives a true indication of the exact course of the projectile from the gun.

A further object is to provide computer mechanism for a sight adapted to determine the exact lead required to hit another aircraft attacking in a pursuit curve, and to set this lead into the mechanism so that the gunner obtains hits by holding his sights directly on the target.

A further object is the provision of a sight designed for accurate fire control at any instant that the gunner is able to position the "pipper" of his sight on the target without the necessity of a period of tracking prior to firing.

A still further object is in the provision of airspeed adjustment mechanism that is independent of the setting of the azimuth and elevation inputs and is made against a fixed scale, so that, if desired, airspeed information is fed automatically into a sight by mechanical means and it is unnecessary for the gunner to make any manual speed settings while using the sight.

The computer mechanism described in this disclosure is primarily designed for defense of a bomber against enemy fighter-plane attacks and for strafing stationary objects on the ground, although it is also capable of reasonable accuracy against any moving or stationary target; the emphasis in design has been to provide for the greatest degree of simplicity and ruggedness in a mechanism for the specialized purpose of defense against enemy fighter planes. Other objects and many of the attendant advantages of this invention will be readily appreciated as the same becomes better understood by reference to the following detailed description when considered in connection with the accompanying drawings wherein:

Figure 1:
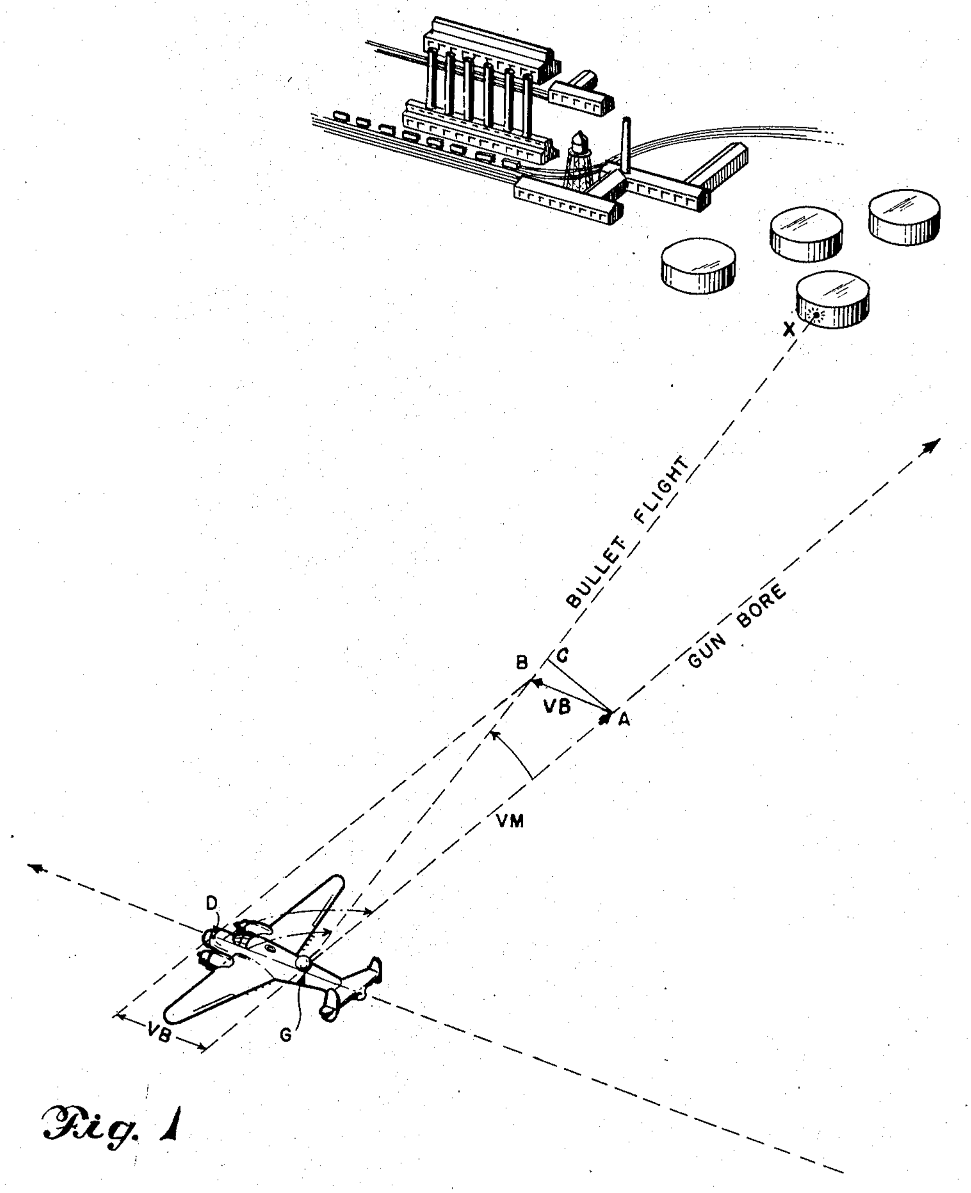
Fig. 1 is a diagrammatic view of an aircraft and a stationary target, showing the geometrical relationship between the aircraft guns and the target.

Inasmuch as the general underlying principles of aerial gunnery are not well known and are often misapplied, it is believed pertinent to include in this disclosure a short explanation of some of the problems of free gunnery and of the mathematical processes by which the mechanism disclosed accomplishes their solutions.

Free gunnery consists of firing from the air at a target in the air or on the ground with a gun mounted flexibly in relation to the air frame. Thus, a free gun can be pointed in any direction, within different limits for different gun positions. The guns of bombing aircraft are free guns in order that the bomber can be protected from attacks originating at any point.

The most difficult phases of free gunnery arise from the fact that, unless the guns are pointed directly ahead or directly astern, the bullets do not travel in the direction in which the guns are pointed. This phenomenon is difficult to explain to aerial gunners because it is at variance with what everyone has learned about shooting on the ground and because, in the air, the instinctive conceptions of spatial relationships are confused by the high speeds of the gun platform.

For example, consider a gun being fired off the starboard beam of a bomber moving north at 300 knots. The gun is pointing due east, but the projectiles do not travel due east. They move about east by north: In the case of one type of a .50 cal. projectile, the course will be about 080 degrees.

An analysis of the forces and motions involved explains this apparent anomaly, and also shows how the course of a bullet fired from a moving aircraft can be predicted. Before the bullet was fired, and while it was still in the barrel immediately after firing, as the gun was moving north at 300 knots, or 507 feet per second, the bullet was obviously moving north at the same velocity. At the muzzle, however, the bullet had a velocity of 2870 feet per second with relation to the gun, and since the gun was pointed east, this velocity was toward the east. The actual motion of the bullet as it left the gun, therefore, consisted of two components, an eastward component of 2870 feet per second, and a northward component of 507 feet per second. Addition of the velocity vectors discloses that the resultant motion was about 10 degrees north of east.

From the foregoing it can be seen that the direction of the bullet's flight relative to the direction of aim of the gun, when fired abeam, is significantly dependent upon the speed of the gun's motion, and the muzzle velocity of the ammunition.

What has actually been determined is that, given a certain craft speed and a certain muzzle velocity, to hit a stationary target bearing 80 degrees off the flight path, the guns must be pointed 90 degrees off the flight path. The difference, 10 degrees, is the amount of deflection, or lead, that must be used to hit the target. (Various minor external ballistic phenomena such as jump, yaw and gravity drop are not discussed since their effect is quite small in relation to the prime problem of lead calculation.)

From the foregoing it will be understood that the "own-speed" lead compensation will be at a maximum when the guns are pointed at an angle of 90° from the flight path of the airplane. Moreover, this is true whether the guns are pointed directly on the beam, directly overhead, or at any other point in a plane normal to the flight path, since in any case the angle between the gun and the flight path is the same. The deflection required for a shot at an angle of 90° to the flight path is a maximum deflection and is directly proportional to the true air speed of the aircraft. The deflection required by a shot directly forward or directly aft is zero. It follows that any shot at any angle less than 90° will require some deflection less than the maximum required on the beam, and that the deflection will depend on the slant angle, which is the resultant of the angle of azimuth and the angle of elevation of the guns.

The present sight accordingly is provided with a mechanical computing arrangement that measures the angles of azimuth and elevation between the barrels of the guns and the flight path of the airplane, determines the slant angle of the target from these, and sets in a deflection accordingly; so that the axis of the optics of the sight gives a true indication of the exact course taken by bullets leaving the gun muzzle.

The sight also includes mechanisms whereby this basic "own-speed" compensation is modified to set in a "target-speed" lead known to be characteristic of the pursuit curve that a fighter plane pilot must follow if he is to keep his own guns bearing properly to effect hits on the bomber.

In the situation illustrated in Fig. 1, where the object is to hit a stationary target at X, the gunner at G wants his bullets to take the direction GX, or GB.

The angle between the line of flight, GD, and the bearing of the target, GB, form the slant angle, DGB.

If the guns are pointed in the direction GA and the parallelogram GABD is constructed, the following relationship exists: the ratio of GD (which is equal to AB) to GA is equal to the ratio of speed of the bomber VB to the muzzle velocity of the bullet VM. Adding the vectorial components of the bullet's motion, GA and AB, resultant motion is in the direction of GB as desired.

The deflection, or lead, is then the angle AGB. If AC is constructed perpendicular to GB, then:

$$\text{Tan } AGB = \frac{AC}{GC} \qquad (1)$$

$$\text{Angle } ABC = \text{angle } DGB$$

$$AC = AB \sin DGB \qquad (2)$$

$$GC = GA \cos AGB \qquad (3)$$

Therefore, from (1), (2) and (3) we have:

$$\text{Tan } AGB = \frac{AB \sin DGB}{GA \cos AGB} \qquad (4)$$

Since AGB is always a small angle, we may say:

$$\text{Tan } AGB = \frac{AB \sin DGB}{GA}$$

or $$\text{Tan } AGB = \frac{VB \sin DGB}{VM} \qquad (5)$$

If DGA is the angle which the axis of the gun bore makes with the flight axis, the bullet actually travels at an angle DGA minus AGB. To hit the target at X, the guns must be aimed so that DGA minus AGB equals DGB since DGA can be measured, on the basis of the previous assumptions, Equation 5, by giving an expression of the angle AGB in terms of the angle DGB, determines all of the data that must be known in order to hit X.

No mention has thus far been made of the altitude of X relative to the bomber. All of the action takes place in a plane determined by the flight axis of the bomber and the target. This plane may be horizontal, vertical or slanting, and it contains all of the lines and angles of the above solution. Equation 5 thus holds good for any stationary target above, below, or level with the gun. It follows that in Fig. 1, if the guns are pointed toward A, the bullets will take the course GB and will hit the target at X.

The same computations hold true in firing at a fighter attacking the bomber in a "fly-through" attack, in which the fighter flies a straight course, firing only at the one moment when he believes the bomber is at the range and bearing where it will be hit by his bullets. At one moment during this attack, the fighter's course will be directly toward the bomber. If, at this instant, a bullet fired from the bomber takes a course directly toward the fighter, the fighter will be hit. To make the bullet take this course, the gunner must apply the same deflection as would be required by a fixed target. Here again, range is relatively unimportant.

Generally, a fighter does not make the type of attack in which he can expect to hit his target at one moment only. As previously stated, an attacking fighter pilot usually attempts to fly such a course that he can fire continuously over a period of time during which his guns will be leading the bomber.

The course the fighter must follow to get continuous hits is predetermined mathematically by the characteristics of the relative motions; that is, the fighter's speed, the bomber's speed, the positions at the start of the attack, etc. The curve itself is known as the "aerodynamic lead pursuit curve."

Figure 2:
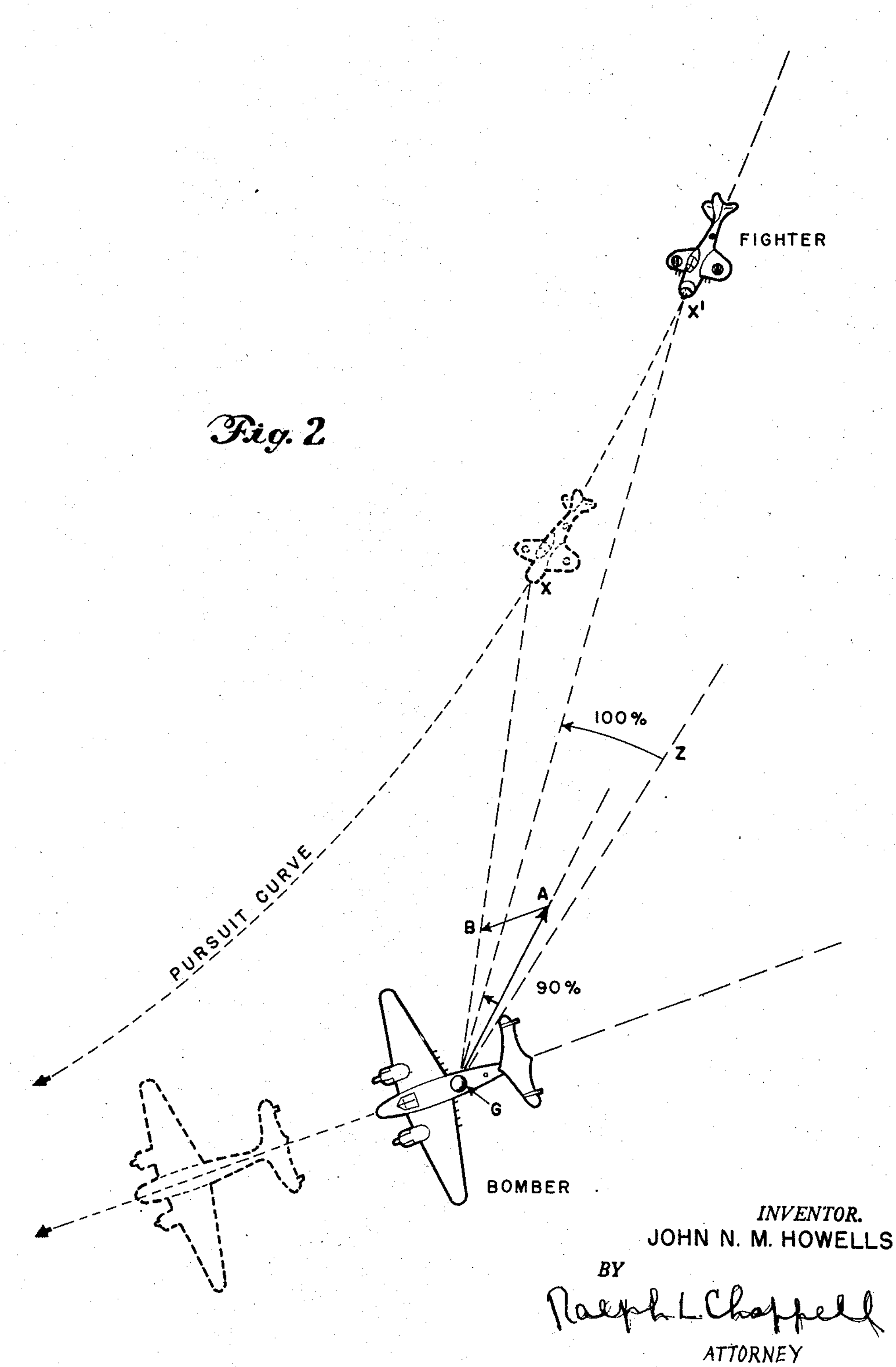
Fig. 2 is a diagrammatic view of an aircraft and a fighter plane following a typical purusit curve, together with diagrammatic indications of the geometrical relationships between the guns of the aircraft and the attacking fighter-plane.

A fighter attacking in such a pursuit curve is shown in Fig. 2. This fighter cannot be considered by the free gunner as a stationary target. When the fighter appears at X', if the free gunner at G applies the full own-speed lead in accordance with Equation 5, so that the guns are aimed along GZ, the bullet will travel along GX'. By the time the bullet has arrived at X', the fighter will be at some such position as X; his bearing from G will have changed by the angle XGX'.

Considerable mathematical and experimental investigation has been made of the nature and amount of this angular deviation XGX'. This deviation is composed chiefly of four factors:

1. The largest factor is the actual curvature of the fighter's path. This curvature is always toward that point in the sky toward which the bomber is moving, and, taken by itself, would require the free gunner to modify his lead in that direction.

2. The second factor is the lead that the fighter is taking to obtain hits on the bomber. This means that the fighter is never, even instantaneously, flying directly toward the bomber, but toward a point ahead of the bomber along its line of flight.

3. The third factor is the "mushing" of the fighter resulting from the centrifugal force to which it is subjected when flying the curved course. Owing to this factor, the fighter is not actually moving along a line parallel to its thrust axis, or the bore of its guns, but has a high angle of attack.

4. The fourth factor is the trail of the free gunner's bullet, which becomes important as soon as the target departs from the character of a stationary target, and has a transverse motion. This factor modifies the lead required by the combination of the other three, and is itself dependent upon the range of the target at each instant.

Investigation of these factors, and experimental work done on the subject has resulted in the conclusions that to a reasonable approximation, the resultant additional lead arising from all these factors (the angle XGX' in Fig. 2) is under all conditions proportional to the own-speed lead that would be called for under those conditions (the angle X'GZ in Fig. 2), but actually is only about 10 per cent of that lead. Its separate dependence on other factors, such as the fighter's speed, range, etc., is slight.

In Fig. 2 then, when the target is at X', the gunner should take a lead equal to 90 per cent of the full own-speed lead X'GZ. In other words, guns should be directed along GA; the bullet will take the course GB and will strike the fighter at X. The total lead taken is the angle X'GA, and is 90 per cent of the angle X'GZ.

The attacking fighter in a pursuit curve is the target with which the free gunner is most vitally concerned, and the settings of the computing mechanism here disclosed are so arranged that the 90 per cent factor is compensated for automatically. In shooting at this type of target, the attacking plane is simply held in the center of the sight reticule. The lead is compensated and applied automatically by the mechanism of the sight.

Though it is generally poor tactics for free gunners to fire at non-attacking planes, it may occasionally be done under one of the following circumstances: Attack by enemy fighters upon other friendly aircraft accompanying the free gunner's plane; the occasional gunnery duels between the free gunners of opposing bombers; the breakaway of the enemy fighter after a pursuit curve attack, or the turn-in into an attack within the free gunner's range. In such situations, an enemy aircraft shows a larger or smaller transverse motion requiring some "target lead" in addition to the "own-speed lead."

It should be borne in mind that under such circumstances, the free gunner's own aircraft is not in any danger. The computer mechanism is not designed to solve the lead problem completely in such a situation, but as soon as the fighter plane becomes dangerous, he must go into a pursuit curve and the computer mechanism will yield a good solution.

Even when firing at a non-attacking target, however, the sight here disclosed is of value, since with the proper setting for firing at stationary targets the reticule shows where the bullets are actually going. The line of flight of each individual bullet corresponds to the line of sight at the instant each bullet is fired. This greatly simplifies the free gunner's problem, for he is now in the situation of a stationary gunner shooting at a moving target. This is the problem faced by fighter pilots, and a doctrine similar to that used in fixed gunnery can be applied with effect.

The specific form of the gunsight illustrated in the drawings includes a housing 10 mounted to move with the gun and arranged to carry an optical system fixed in a vertical lens barrel 11 mounted rotatably between an upper bearing 12 and a lower bearing 13. The lens barrel 11 includes a plurality of lenses and a sight reticule 14 of a conventional type. The reticule is illuminated by a light source housed in the lower part of the lens barrell 11. A collimated image of the reticule 14 is projected upwardly through the top lens 15 of the lens barrel to a transparent reflector 16 carried in the hood 17 of the sight. The hood 17 is rotatably secured on a pair of pins 18, each supported by a bracket 19 secured to a flange 21 on the lens barrel 11 directly above the bearing 12. The lens barrel 11 and the flange 21 rotate as a unit so that, as the barrel 11 is rotated, the brackets 19 swing about the center of the barrel and cause the hood 17 and the reflector 16 to move in azimuth with the movements of the lens barrel. A light spring 23 extends between one of the brackets 19 and a stud 24 on the housing 10 of the sight to provide a light tension tending to rotate the hood and lens barrel in a clockwise direction as viewed from above.

Figures 9, 10:
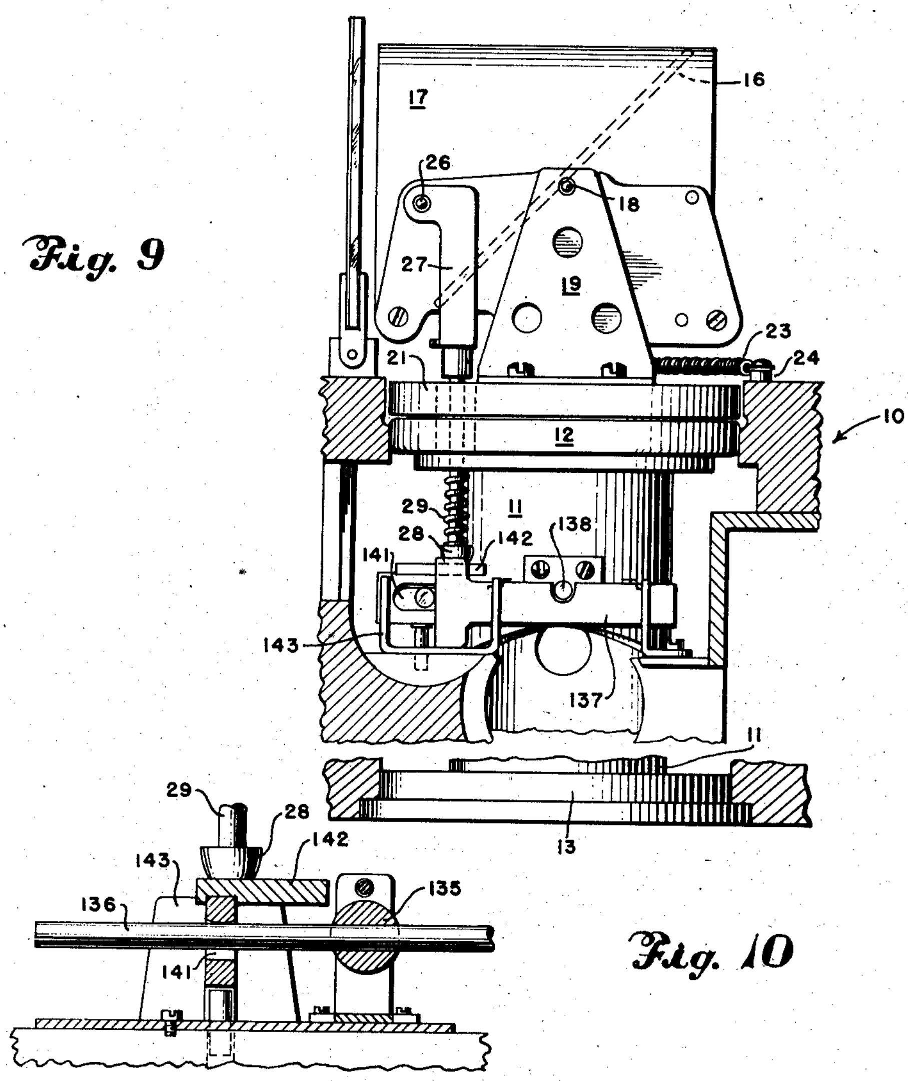
Fig. 9 is a fragmental sectional view taken substantially on the plane of the line 9—9 in Fig. 6.
Fig. 10 is a detail sectional view taken substantially on the plane of the line 10—10 in Fig. 6.

The forward end of the hood 17 carries a pair of pins 26 bridged by the yoke 27 (see Fig. 9). The yoke includes a control spindle 28 extending downwardly through the flange 21 to a point adjacent the side of the lens barrel 11. A light compression spring 29 is telescoped over the spindle between the flange 21 and the head 28. This spring tends to pull the forward end of the hood 17 downwardly, to rotate the reflector 16 in a counterclockwise direction around the pins 18.

From the foregoing, it will be seen that the image from the lens barrel 11 will be reflected from the surface of the transparent reflector 16, which will act as a combining glass so that as the gunner looks through the hood 17 the collimated image of the reticule 14 of the sight will appear superimposed on the field of vision. Obviously, since the combining glass is mounted for rotational movement about two axes, it may be shifted in elevation and azimuth to offset the optical axis of the sight from the axis of the guns in any amount and in any direction, so that any lead required may be set in by deflecting the axis of the sight from the bore of the guns. The computation of the direction and amount of deflection is accomplished automatically by computer mechanism indicated generally at 31.

It has been previously explained that the amount of "own speed" lead required is dependent on the true air speed of the aircraft and on the slant angle between the bore of the guns and the line of flight of the plane. Inasmuch as the guns of the plane are mounted so that they move in elevation on one axis and move in azimuth on a second axis, the actual angle between the gun bores and the line of flight of the plane is the sum of the angle of gun elevation and angle of gun azimuth. Information as to these angles can be fed into the computer 31 of the sight automatically by flexible cables attached to gears in the turret, so that the cables are rotated as the guns are moved in azimuth and elevation.

Figure 3:
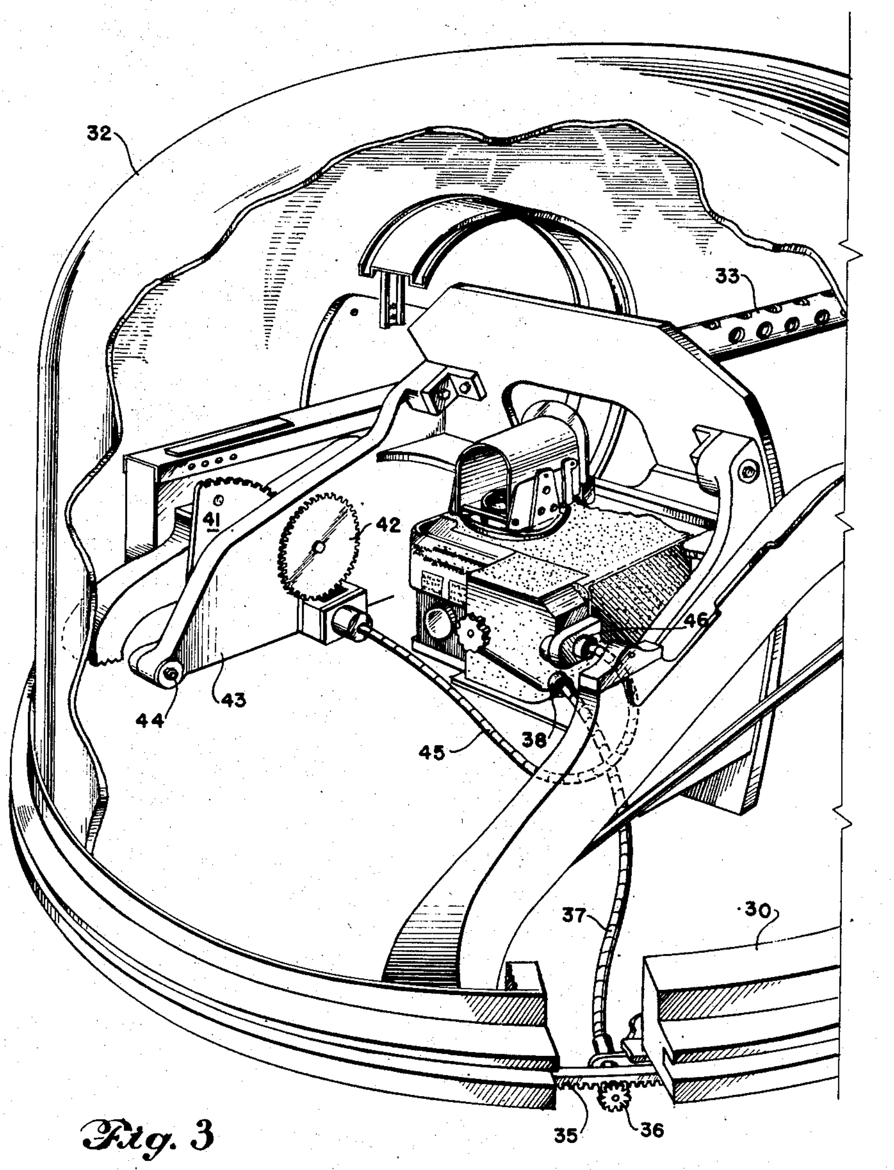
Fig. 3 is a fragmental perspective view of a typical aircraft machine gun turret showing the computer mechanism as associated with the turret and guns.

In Fig. 3 of the drawings, a typical gun turret 32 is provided with an azimuth ring gear 35 and pinion 36 secured to the end of a flexible shaft 37. As the turret is rotated and the azimuth angle of the guns 33 changes, the pinion 36 will rotate and transmit motion through the flexible shaft 37 to the sight. Thus motion from the turret ring gear will be transmitted to the sight whenever the angle of gun azimuth changes, and the azimuth input shaft 39 will be maintained in a position corresponding to the azimuth angle of the guns.

Information as to the angle of elevation of the guns is also fed to the computer 31 by gearing including a fixed segmental gear 41 and spur gears 42 so that any movement in elevation of the gun yoke 43 about the elevation trunnions 44 will cause rotation of the gears 42 and will feed the elevation information through the flexible shaft 45 to the coupling 46 on the sight housing and thence to the azimuth angle input gear 47 of the sight.

The angles of azimuth and elevation of the gun are combined by the computing mechanism 31 into a resultant slant angle corresponding to the angle between the bore of the guns and the line of flight of the airplane. This slant angle is further combined with factors representing the true air speed of the aircraft and the muzzle velocity of the guns to determine the "own speed" lead required to hit a fixed target at that particular slant angle and that exact speed.

The computer 31 is coupled directly to the combining glass so that the lead determined by the computer 31 is set in automatically to deflect the optics of the sight from the gun barrels. No matter what position the guns assume, the optical axis of the sight is deflected in the direction and amount necessary to obtain hits. Thus, when firing at a stationary target, it is unnecessary for the gunner to make an estimation of lead. He can obtain hits by holding the sight reticule directly on the target.

The computer 31 is a device for combining a factor representing gun azimuth, a factor representing gun elevation, and a factor representing velocity of the aircraft with a fourth factor representing muzzle velocity of a bullet fired from the free guns of the bomber. The desired result is accomplished by a yoke and gear mechanism arranged to move a single universal pivot in any direction and to control the deflection of the optical axis of the sight from the bore of the guns in accordance with the position of the universal pivot.

Figure 6:
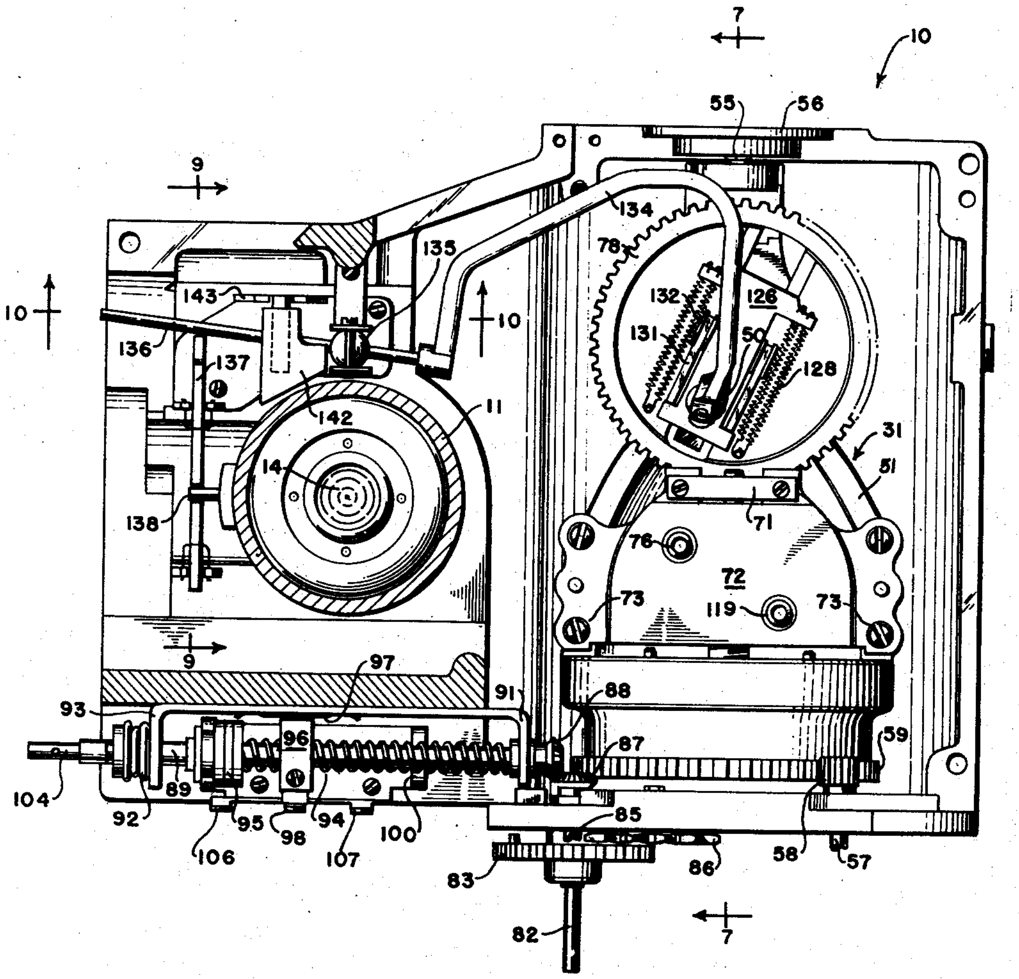
Fig. 6 is a plan sectional view of the mechanism illustrated in Figs. 4 and 5.
Figure 7:
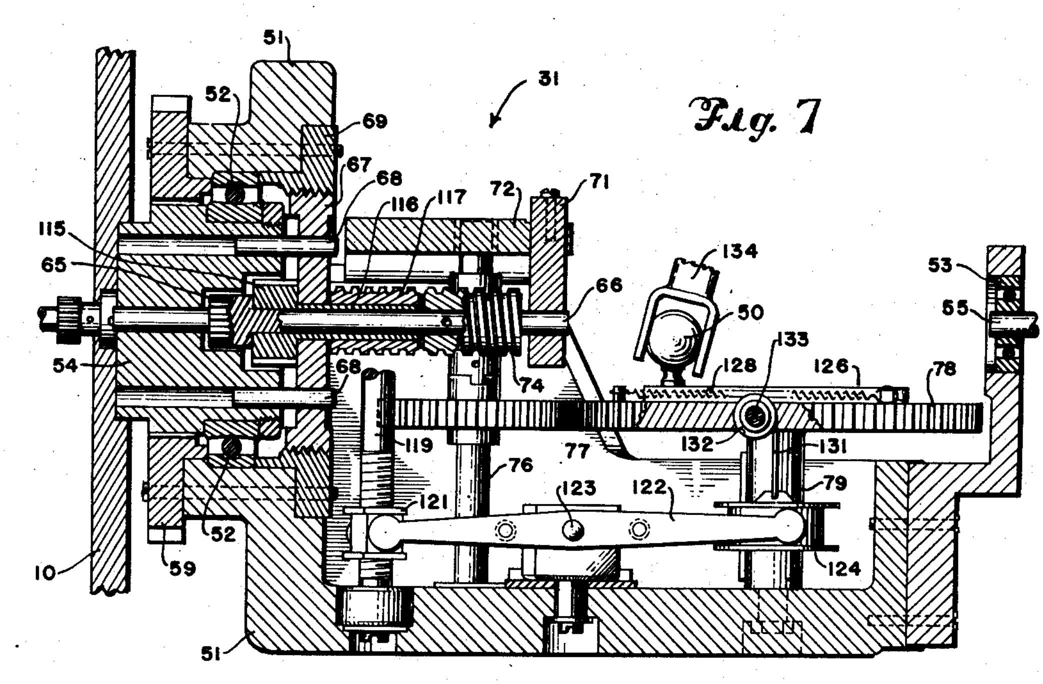
Fig. 7 is a central detail sectional view taken substantially on the plane of the line 7—7 in Fig. 6.
Figure 8:
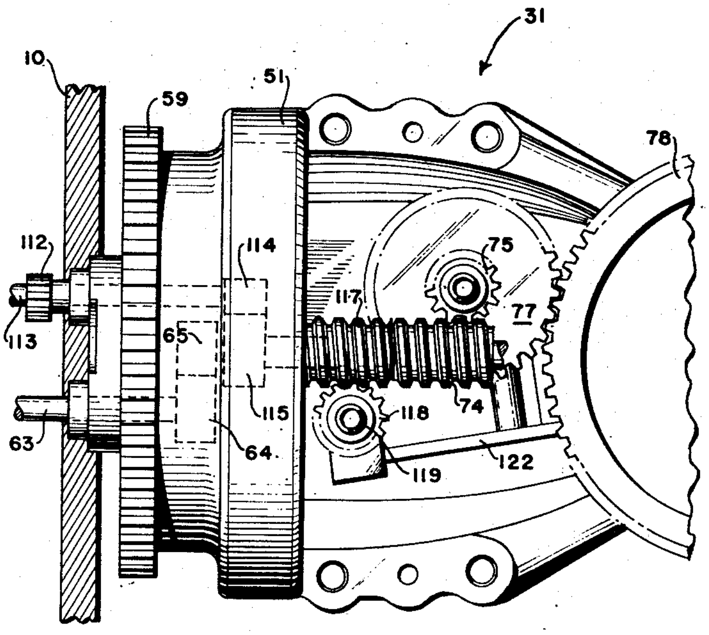
Fig. 8 is a detail plan view of the computer mechanism with the cover plate removed.

The computer 31 consists of a swinging yoke 51 housed within the sight housing 10 and mounted on a pair of anti-friction bearings 52 and 53 (see Figs. 6, 7 and 8). The bearing 52 is carried by a stationary input block 54 bolted to the wall of the sight housing 10 and the bearing 53 is carried by a spindle 55 on the mounting plate 56 secured in the opposite wall of the housing 10.

Figure 5:
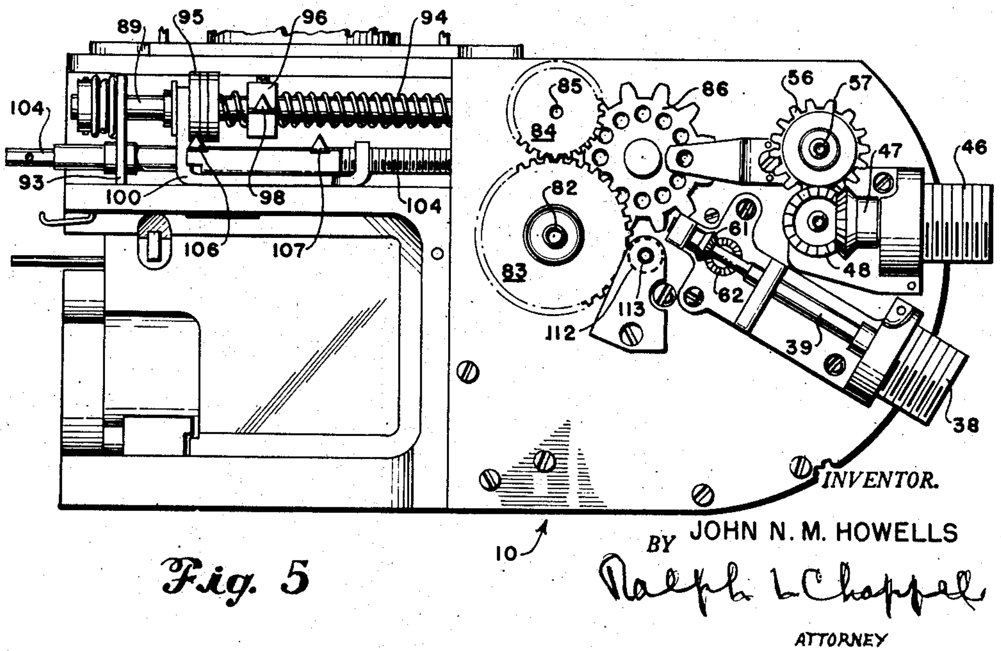
Fig. 5 is a front elevational view, similar to Fig. 4, with the cover plates and lamp mounting removed.

The yoke 51 includes internal mechanisms to move the universal pivot 50 in a complex motion in accordance with the azimuth of the guns of the bomber and according to the bomber speed. Information as to the elevation of the guns is transmitted to the pivot 50 by swinging the entire yoke 51 on the bearings 52 and 53, and the position it assumes on these bearings is dependent on and controlled by the position of elevation of the guns in the turret 30. To this end, the elevation input from the turret is fed form the spur gears 42 through the flexible cable 45 to the elevation input fitting 46 on the sight and thence through the elevation input bevel gears 47 and 48 to an elevation input pinion, not shown, and to the gear 56 (see Fig. 5). The gear 56 is fixed on the shaft 57 which extends through the wall of the sight housing 10 and carries a pinion 58 on its inner end. The pinion 58 is in mesh with the driven gear 59 secured to the yoke 51, so that the entire yoke is rotated about the axis of the bearings 52 and 53 in response to changes in elevation of the guns in the turret 30.

The position of the turret in azimuth also influences the position of the universal pivot 50. Azimuth information is picked up by the pinion 36 and transmitted through the flexible cable 37 through the azimuth input fitting 38 of the sight and thence through the azimuth input bevel gears 61 and 62 (see Fig. 5) to the azimuth input shaft 63 in the input block 54. The inner end of the shaft 63 (see Fig. 8) carries a pinion 64, and the pinion 64 meshes with a small gear 65 on the outer end of the worm shaft 66. The shaft 66 is supported at one end by a disc 67, which is in threaded engagement with the threaded ring 69 fixed to the body of the yoke 51, and is restrained against rotation by a pair of dowel pins 68 mounted in the input block 54. The opposite end of the worm shaft 66 is carried by a bracket 71 mounted on a cover plate 72 secured to the frame of the yoke 51 by a plurality of screws 73.

The shaft 66 carries a driving worm 74 to drive a gear 75 on a vertical shaft 76 extending between a lower bearing in the frame of the yoke 51 and an upper bearing in the cover plate 72. The shaft 76 also carries a driving gear 77 in mesh with the large azimuth gear 78 mounted rotatably on a vertical center shaft 79. The shaft 79 is mounted in the frame of the yoke 51.

Figure 4:
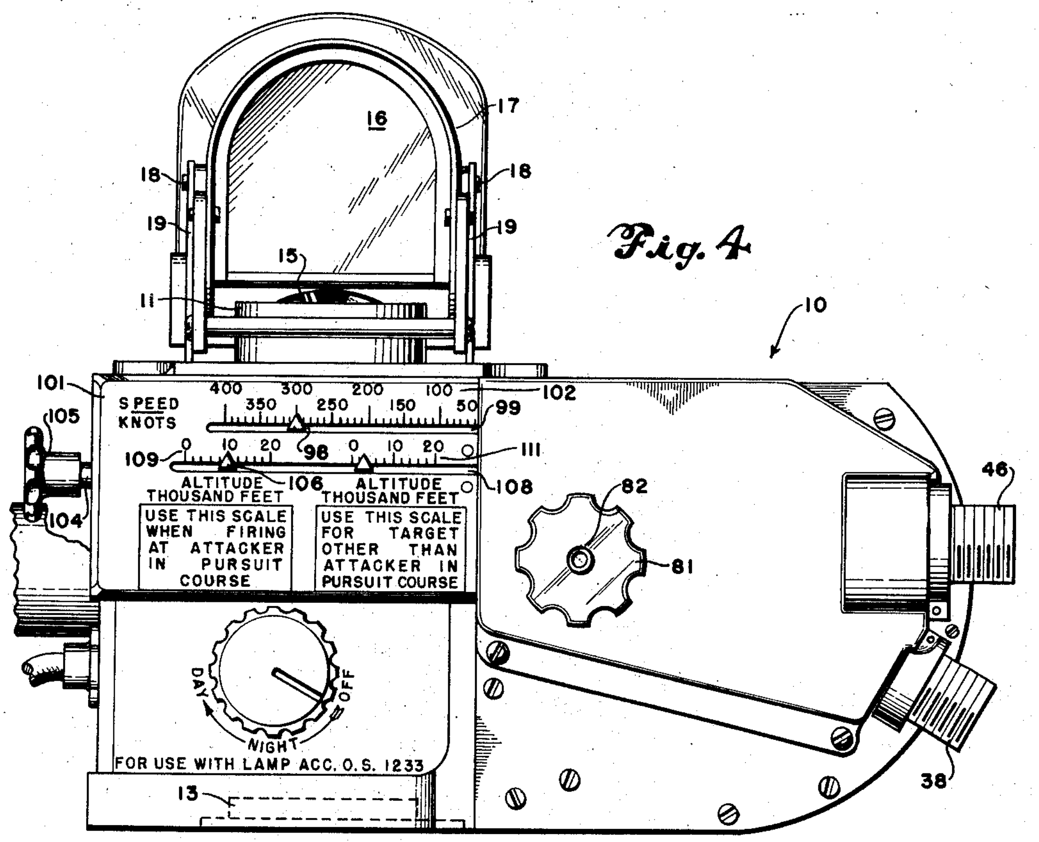
Fig. 4 is a front elevational view of a computer mechanism constructed in accordance with the teachings of the present disclosure.

The speed information to the computer 31 is set into the sight manually by manipulating the speed setting knob 81 or it can be fed to the sight mechanically through a true air-speed input mechanism. It is to be noted, however, that although conventional aircraft instruments normally give a reading of indicated air-speed, the proper functioning of the sight depends on true air-speed. In view of this, the sight has been designed to include a compensating scale in the nature of a proportional computer, so that the sight need only be set to the altitude and indicated air-speed of the aircraft. The speed proportioning mechanism (see Figs. 4, 5 and 6) calculates the true air-speed and sets the computer 31 accordingly.

When the speed input knob 81 is rotated, it acts through its shaft 82 and through the gears 83 and 84 to rotate the shaft 85 extending inwardly through the wall of the sight housing 10. A mechanical limit stop 86 (see Fig. 6) is associated with the gear 83 to limit the number of revolutions it can make in either direction and to prevent over-running the speed setting limits of the device. The inner end of the shaft 85 carries a bevel gear 87 in mesh with a bevel gear 88 on an air-speed shaft 89. The shaft 89 extends between bearings 91 and 92 on a bracket 93 and carries a helical spring 94. One end of the spring is fixed to rotate with the shaft at the position of the bearing 91. The opposite end is secured to and rotates with a collar 95 splined to the shaft 89 near its opposite end. The spring 94 and shaft 89 thus form a screw of variable pitch, since the collar 95 can be shifted longitudinally along the shaft 89 to stretch or compress the spring 94. This "variable pitch screw" carries a traveling nut 96 provided with a leaf spring 97 riding in a slot in the back of the bracket 93 to prevent rotation of the nut. The nut 96 also carries an indicated air-speed pointer 98 extending outwardly through the slot 99 in the cover plate 101 to the indicated speed scale 102.

It has been previously mentioned that the pitch of the screw 89—94 is variable according to the position assumed by the collar 95. This collar is shifted longitudinally along the shaft 89 by a U-shaped bracket 100 mounted on the threaded shaft 104 positioned immediately below the shaft 89 and also carried by the bracket 93. The shaft 104 extends outwardly through the cover plate 101 to terminate in an altitude-setting knob 105. The bracket 100 also carries a pair of altitude pointers 106 and 107 that extend through the slot 108 to the altitude scales 109 and 111 respectively. From the foregoing, it will be seen that as the speed-input knob 81 is rotated, speed information is fed into the proportioning device combining the variable pitch screw 89—94 and its associated mechanisms so that when the altitude scale 111 is adjusted to the altitude of the aircraft, the spring 94 will be distorted according to the variation between true air-speed and indicated air-speed at the specified altitude. Thus the spring will compute the proportional relationship between true and indicated air-speed at any given altitude, and it is only necessary for the pilot to set the pointer 96 at his indicated air-speed and he will feed true air-speed information to the computer 31 automatically. The true air-speed input to the computer 31 extends from the gear 83 through the pinion 112 on the shaft 113, which extends through the wall of the sight housing 10 and terminates in a pinion 114 in mesh with a gear 115 carried by a sleeve 116 rotatable on the worm shaft 66. The sleeve 116 carries a worm 117 at its inner end and the worm in turn meshes with a gear 118 on a shaft 119 extending between a lower bearing in the yoke 51 and an upper bearing in the cover plate 72. The lower portion of the shaft 119 is threaded and carries an internally threaded collar 121 to control one end of the lever 122. The lever 122 is mounted on a pivot 123 fixed to the yoke 51, and its opposite end engages a sliding collar 124 mounted for vertical movement on the center shaft 79 of the azimuth gear 78. The azimuth gear includes a radially-shiftable carriage 126 on which the universal pivot point 50 is mounted. A plurality of small springs 128 urge the carriage transversely of the gear 78 and tend to move the universal pivot 50 to its position of maximum radius. This movement is controlled, however, by the position of the sliding collar 124 on the center shaft 79 of the gear, since the collar 124 is splined to the shaft and is connected to the carriage 126 by a pair of flexible metal bands or tapes 131 extending upwardly from the collar 124 and passing over idler rollers 132 mounted on the shafts 133. It is apparent from the foregoing that the sliding collar 124, the lever 122, bearing springs 128, shaft 79 and bands 131 form a slip joint so constructed that the radial position of the carriage 126 on the rotatable element carried by the swinging yoke is not affected by rotation of said element.

The universal pivot 50 controls the position of the lens barrel 11 and combining glass 16 of the sight mechanism and includes a goose-neck arm 134 extending from the pivot 50 through a ball and socket joint 135 to a straight operating rod 136. The rod 136 contacts a straight vertical edge of a slide 137 and the slide in turn is notched to engage a pin 138 fixed to the lens barrel 11. The operating rod 136 also engages the lower surface of a slot 141 in a vertically-shiftable table 142. The table 142 (see Figs. 6, 9 and 10) is carried by the bracket 143, and supports the lower end 28 of the operating lever 27, which in turn controls the pivotal movement of the combining glass 16 as previously described.

In use, the sight is mounted to move with the gun. The sight case is fixed with respect to the guns and is connected to stationary elements of the air frame, so that as the sight and guns move, information as to gun azimuth and elevation are fed to the computing mechanism. One typical installation is illustrated in Fig. 3. Here the sight casing is mounted on a shelf carried by the gun yoke, so that as the guns are moved in elevation, the elevation angle information is fed to the sight through the flexible cable 45 while azimuth information is fed to the sight through the cable 37. The computer 31 of the sight combines these two angles into a resultant slant angle which is integrated with information as to the speed of the plane to give a resultant representing the required deflection between the optics of the sight and the bore-sight of the guns.

Gun-azimuth information is supplied to the computer through the shaft 39, bevel gears 61—62, azimuth input-shaft 63, and gears 64—65. The gear 65 rotates the worm 74 to drive gear 75, the intermediate gear 77 and the azimuth gear 78.

Speed information is set into the sight manually by manipulation of the speed input-knob 81 which acts through the shaft 82 and gears 83—112 to control the speed input-shaft 113 and pinions 114—115. These pinions actuate the worm 117 and gear 118 and drive the vertical screw 119. Rotary movement of the screw 119 moves the threaded collar 121 vertically, causing the lever 122 to raise or lower the collar 124 and act through the flexible tapes to shift the carriage 126 and universal pivot 50 radially of the azimuth gear 78. It has been previously mentioned that the solution of own-speed lead requires a speed input of true air-speed rather than indicated air-speed. In view of this, the air-speed input-shaft 82 and gear 83 are coupled to a proportioning mechanism through the gear 84, shaft 85, and bevel gears 87 and 88. This mechanism couples the speed input-knob 81 with the variable-pitch screw 89—94 so that the relationship between true air-speed and indicated air-speed is established. It is only necessary to manipulate the knob 105 to set the altitude pointer 107 at the correct altitude, and to then set the pointer 98 to the indicated air-speed by the knob 81. The relationship between indicated air speed and true air-speed is established by the mechanism, so that although indicated air-speed is shown by the pointer 98 the information fed to the computer represents the true air-speed.

When firing at an attacker in a pursuit curve, the total lead taken is 90 per cent of the own-speed lead required for a stationary target. This proportion is set into the sight by providing a separate altitude scale 109, offset from the altitude scale 111, so that when the altitude of the bomber is set in on this scale the target lead factor is compensated for automatically and the information fed to the computer is 90 per cent of the own-speed lead.

Information as to the elevation of the guns is supplied through shaft 45, the bevel gears 47, 48 (see Fig. 5) and thence to the gear 56 and elevation input-shaft 57. The shaft 57 carries a pinion 58 in mesh with the ring gear 59 on the swinging yoke 51 of the computer (see Fig. 6) so that any change in elevation of the guns rotates the pinion 58 and swings the entire computer frame around the bearings 52 and 53. It should be noted, however, that this swinging movement of the frame 51 has no effect on the speed and azimuth settings of the computer. This is because the longitudinal position of the worms 74—117 are both controlled by internal threads on the ring 69. The threads within the ring are of the same pitch as the thread of the worms 74—117, so that the worms are moved longitudinally to compensate for the progression of the gears 75 and 118 around the worms.

From the foregoing, it will be apparent that the relative position of the universal pivot 50 is responsive to changes in the factors of gun elevation, gun azimuth and bomber speed, so that it can be used to deflect the optics of the sight the required degree from the bore-sight of the guns. This is accomplished by the goose-neck arm 134 and rod 136 acting through linkages to control the azimuth and elevation tilting of the transparent reflector 16. It should be noted, however, that the point of contact between the elevation table 142 and the rod 136 is only half of the distance between the universal pivot 135 and the azimuth slide-link 137, so that any movement of the pivot 50 will move the reflector twice as much in azimuth as in elevation. However, since the action of the reflector will offset the optical axis of the collimated-reticule image an amount double the angle of tilt of the reflector, the net result will be that the complex movement of the reflector 16 will offset the optical axis of the sight exactly in accordance with the slant angle between the path of the aircraft and the target.

While I have shown and described a preferred embodiment of the present invention, I am aware that it is subject to various modifications and many different mechanical designs and I therefore wish to be limited only by the scope of the appended claims.

The invention described herein may be manufactured and used by or for the Government of the United States for governmental purposes without the payment of any royalties thereon or therefor.

I claim:

1. As a mechanical movement, computer mechanism including a swinging yoke pivoted on and extending between a pair of spaced bearings, a rotatable element carried by the yoke and mounted for rotation on an axis normal to the axis of rotation of the yoke, a radially shiftable carriage on the rotatable element and a universal pivot mounted on the carriage together with means to rotate the rotatable element relative to the yoke, said means including an input shaft coaxial with and extending through one of the yoke bearings, a worm carried by said shaft, and a gear adapted to be driven by the worm and to drive the rotatable element, means to move the shiftable carriage and the universal pivot in a radial direction with respect to the rotatable element, said means including a second input shaft coaxial with and extending through one of the yoke bearings, a worm carried by said second input shaft, a gear adapted to be driven by said worm, a rotatable screw associated with said gear, a traveling nut on the screw, and a lever pivoted on the yoke and actuated by the traveling nut, and means including a flexible tension element between the said lever and the shiftable carriage, means for rotating the yoke, and means responsive to the rotation of the yoke to shift both the aforementioned worms longitudinally.

2. As a mechanical movement, a swinging yoke pivoted on and extending between a pair of spaced bearings, a rotatable element carried by the yoke and rotatable on an axis normal to the axis of rotation of the yoke, a carriage mounted on the rotatable element together with means to shift said carriage radially with respect to the rotatable element, said means including an input shaft coaxial with and operating through one of the yoke bearings, a lever pivoted on the yoke and actuated by the shaft, and means responsive to movement of said lever to move said carriage.

3. As a mechanical movement, computer mechanism including a swinging yoke pivoted on and extending between a pair of spaced bearings, a gear carried by the yoke and rotatable on an axis normal to the axis of rotation of the yoke, a radially shiftable carriage on the gear and a universal pivot mounted on the carriage, together with means including a spur gear and pinion to rotate the gear, said means further including an input shaft coaxial with and operating through one of the yoke bearings, a worm carried by said input shaft, and a gear adapted to be driven by the worm, together with means for rotating the yoke and means responsive to the rotation of the yoke to shift the aforementioned worm longitudinally.

4. As a mechanical movement, computer mechanism including a swinging yoke, at least one bearing supporting said yoke, a rotatable element carried by the yoke and mounted for rotation on an axis normal to the axis of rotation of the yoke, a radially shiftable carriage on the rotatable element and a universal pivot mounted on the carriage, together with means to rotate the element relative to the yoke, said means including an input shaft coaxial with and extending through a yoke bearing and means responsive to the movement of said input shaft to drive the rotatable element, means to move the shiftable carriage and the universal pivot in a radial direction with respect to the rotatable element, said last named means including an input shaft coaxial with and extending through a yoke bearing, and a slip joint including a collar and fork whereby the radial position of the carriage on the rotatable element will be unaffected by rotary movements of the element.

5. As a mechanical movement, a swinging yoke pivoted on and extending between a pair of spaced bearings, a rotatable element carried by the yoke and rotatable on an axis normal to the axis of rotation of the yoke, a radially shiftable carriage on the rotatable element, together with means to move the radially shiftable carriage in a radial direction with respect to the rotatable element, said means including an input shaft coaxial with and operating through one of the yoke bearings, and means responsive to movement of the input shaft to shift the carriage radially of the rotating element, said last named means including at least one slip joint so that the position of the carriage on the rotatable element will be unaffected by other movements of the element.

6. Computer mechanism comprising a rotatable yoke, means for rotating said yoke, an element carried rotatably by said yoke on an axis normal to the axis of rotation of said yoke, a radially shiftable carriage seated on said element, a universal pivot mounted on said carriage, means to rotate said element relative to said yoke, said means including an input shaft, a worm carried by said shaft and a gear driven by said worm and driving said element, means to move said carriage and said pivot radially with respect to said element, said means including a second input shaft, a worm carried by said second shaft, a gear driven by said worm, a screw associated with said gear, a traveling nut carried on said screw, and a lever pivoted on said yoke and actuated by said nut, tensioning means between said lever and said carriage, and means responsive to the rotation of said yoke to shift said worms longitudinally.

7. Computer mechanism comprising a rotatable yoke, means for rotating said yoke, a gear carried rotatably by said yoke on an axis normal to the axis of rotation of said yoke, a radially shiftable carriage on said gear, a universal pivot mounted on said carriage, means to rotate said gear, said means including an input shaft, a worm carried by said input shaft, and means responsive to the rotation of said yoke to shift said worm longitudinally.

8. Computer mechanism comprising a rotatable yoke, an element carried rotatably by said yoke on an axis normal to the axis of rotation of said yoke, a radially shiftable carriage seated on said element, a universal pivot mounted on said carriage, means to rotate said element relative said yoke, said means including an input shaft, means responsive to movement of said input shaft to drive said element, means to move said carriage and said pivot radially with respect to said element, said last-named means including an input shaft and a slip joint including a collar and fork whereby the radial position of said carriage on said element will be unaffected by rotary movements of said element.

9. Computer mechanism comprising a yoke, at least one bearing supporting said yoke, an element carried rotatably by said yoke on an axis normal to the axis of rotation of said yoke, a radially shiftable carriage seated on said element, a universal pivot mounted on said carriage, means to rotate said element relative said yoke, said means including an input shaft coaxial with and extending through a yoke bearing, means responsive to movement of said input shaft to drive said element, means to move said carriage and said pivot radially with respect to said element, said last-named means including an input shaft coaxial with and extending through a yoke bearing and a slip joint including a collar and fork whereby the radial position of said carriage on said element will be unaffected by rotary movements of said element.

10. Computer mechanism comprising a rotatable yoke, an element carried rotatably by said yoke, a radially shiftable carriage seated on said element, means to move said carriage radially with respect to said element, said means including an input shaft, means responsive to movement of said shaft to shift said carriage radially of said element, said last-named means including at least one slip joint so that the position of the carriage on said element will be unaffected by other movements of said element.

11. Computer mechanism comprising a yoke pivoted on and extending between a pair of spaced bearings, an element carried rotatably by said yoke, a radially shiftable carriage seated on said element, means to move said carriage radially with respect to said element, said means including an input shaft coaxial with and operating through one of said bearings, means responsive to movement of said shaft to shift said carriage radially of said element, said last-named means including at least one slip joint so that the position of the carriage on said element will be unaffected by other movements of said element.

JOHN N. M. HOWELLS.

REFERENCES CITED

The following references are of record in the file of this patent:

UNITED STATES PATENTS

| Number | Name | Date |
|---|---|---|
| 683,204 | Grubb | Sept. 24, 1901 |
| 1,346,412 | Meitner | July 13, 1920 |
| 2,079,625 | Morgan | May 11, 1937 |
| 2,105,985 | Papello | Jan. 18, 1938 |
| 2,185,633 | Horsley | Jan. 2, 1940 |
| 2,194,141 | Estoppey | Mar. 19, 1940 |
| 2,235,826 | Chafee | Mar. 25, 1941 |
| 2,237,613 | Petschnig | Apr. 8, 1941 |
| 2,363,523 | Greenblatt, Jr., et al. | Nov. 28, 1944 |
| 2,364,152 | MacGill | Dec. 5, 1944 |
| 2,383,952 | Bates | Sept. 4, 1945 |
| 2,384,036 | Klemperer et al. | Sept. 4, 1945 |
| 2,385,952 | Svoboda | Oct. 2, 1945 |

FOREIGN PATENTS

| Number | Country | Date |
|---|---|---|
| 161,752 | Great Britain | Apr. 21, 1921 |
| 598,006 | Germany | June 4, 1934 |